Sept. 2, 1941.  R. J. OLANDER  2,254,385
QUICK TAKE-UP MECHANISM
Filed April 26, 1940   2 Sheets-Sheet 1
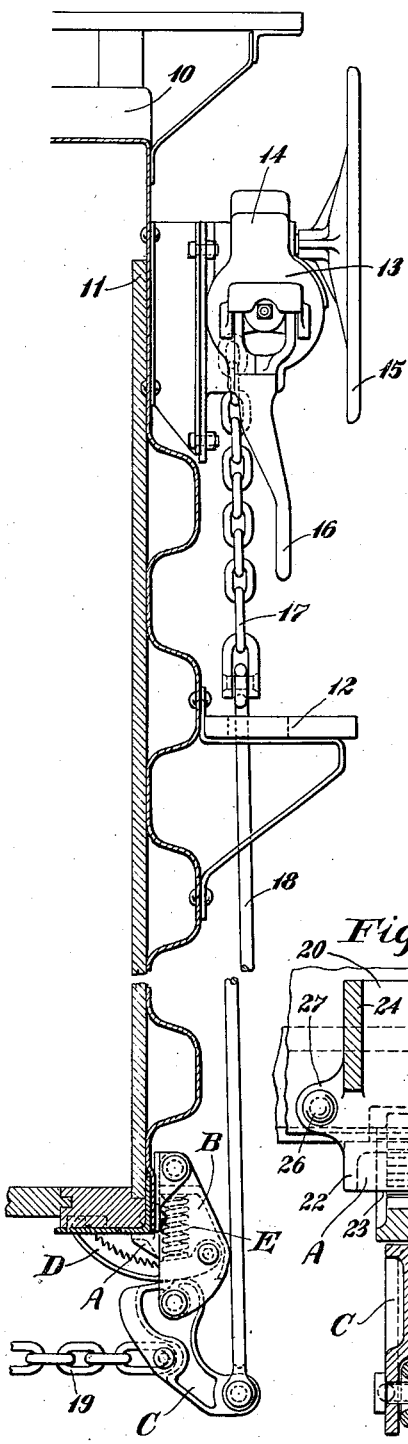
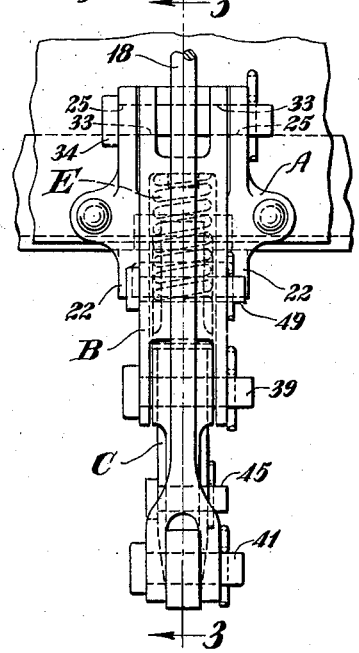
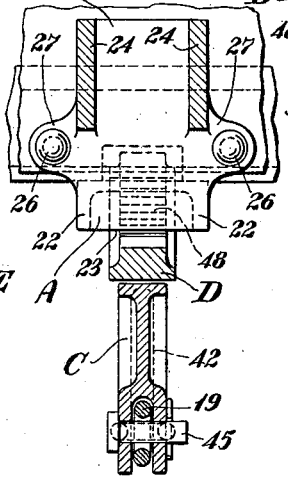
Inventor
Roland J. Olander
By Henry Fuchs
Atty.

Sept. 2, 1941.        R. J. OLANDER        2,254,385
QUICK TAKE-UP MECHANISM
Filed April 26, 1940        2 Sheets-Sheet 2
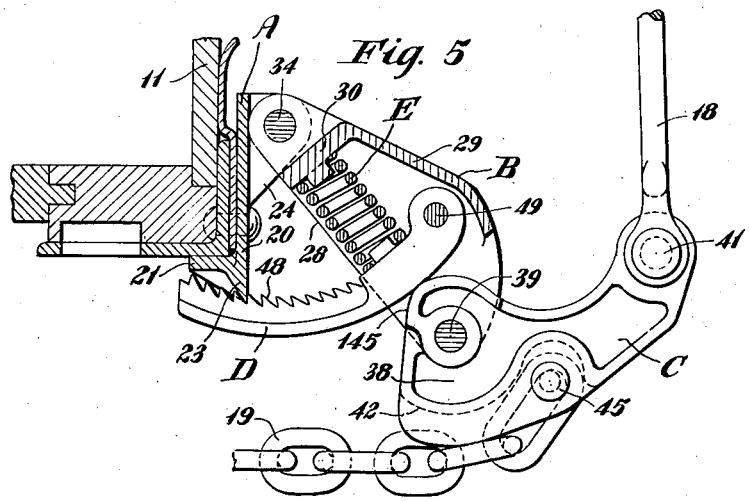
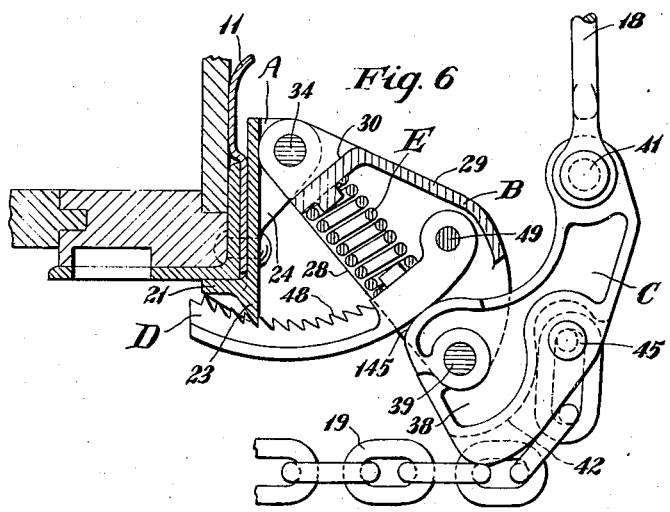
Inventor
Roland J. Olander
By Henry Fuchs
Atty.

Patented Sept. 2, 1941

2,254,385

UNITED STATES PATENT OFFICE 2,254,385

QUICK TAKE-UP MECHANISM

Roland J. Olander, Chicago, Ill., assignor to W. H. Miner, Inc., Chicago, Ill., a corporation of Delaware Application April 26, 1940, Serial No. 331,835

8 Claims. (Cl. 74—517)

This invention relates to improvements in quick take-up mechanisms for hand brakes.

One object of the invention is to provide a quick take-up mechanism for power multiplying hand brakes for cars, comprising efficient means for quickly taking up the slack in the brake mechanism proper of the car during initial operation in applying the brakes, followed by multiplication of power during final application of the brakes, wherein the power multiplying action is automatically effected when the tension in the brake mechanism is increased by contact of the brake shoes with the car wheels.

Another and more specific object of the invention is to provide bell crank lever means comprising two pivotally connected elements for transmitting the power from the winding mechanism of a hand brake to the brake shoes of the brake mechanism proper, wherein the pivotally connected elements of the bell crank lever means are arranged to swing as a unit to provide a relatively long motion increasing lever arm effect to quickly take up the slack during initial application of the brakes, and adapted to swing one with reference to the other when the tension in the brake mechanism reaches a predetermined amount, to provide a relatively shorter power multiplying lever arm effect during final application of the same.

A further object of the invention is to provide a bell crank lever means of the character set forth in the preceding paragraph, wherein one of the pivotally connected elements is in the form of a swinging support, pivotally connected at its upper end to the car and arranged to be automatically locked against backward movement during application of the brakes, and the other of said pivotally connected elements is in the form of a bell crank member swingingly connected at its upper end to the lower end of the first named element, and wherein the two pivotally connected elements are held against relative swinging movement during initial application of the brakes by spring resistance means of a capacity to yield when the tension in the brake mechanism increases as the slack is completely taken up, to permit swinging movement of the bell crank member with respect to its support, and automatic locking of the support against backward movement, whereby the two elements swing as a unit during initial application of the brakes to provide rapid take-up of the slack in the brake mechanism and the bell crank member swings relatively to the swinging support during final application of said brakes to provide power multiplication.

Other objects of the invention will more clearly appear from the description and claims hereinafter following.

In the drawings forming a part of this specification, Figure 1 is a vertical longitudinal sectional view through the end portion of a railway car, illustrating my improvements in connection therewith, said view being partly broken. Figure 2 is an elevational view, looking from right to left in Figure 1, of the mechanism at the lower end of the car on an enlarged scale. Figure 3 is a vertical sectional view, corresponding substantially to the line 3—3 of Figure 2. Figure 4 is a vertical sectional view, corresponding substantially to the line 4—4 of Figure 3. Figures 5 and 6 are views similar to Figure 3, but showing the parts in different operative positions.

In said drawings, 10 indicates the end portion of a railway car having a vertical end wall 11 on which is mounted the usual platform 12 for the brakeman.

My improved quick take-up mechanism is herein illustrated in connection with a power multiplying brake mechanism 13 of well-known type, comprising a worm driven winding element for the chain, as shown in Patents Nos. 1,974,581 and 1,854,804, granted to me. The chain winding element and associated mechanism of the hand brake 13 are contained in a housing 14 secured to the end wall 11 of the car, and said mechanism is actuated by the usual hand wheel 15, as disclosed in the patents hereinbefore referred to. The worm operated actuating means is connected to the winding element by a lever operated clutch means. In the brake mechanism illustrated herein the clutch operating lever is indicated by 16. The winding element of the power multiplying brake mechanism 13 has a chain section 17 connected thereto, said section being wound on said element when the hand wheel 15 is rotated in brake tightening direction. A pull-up rod 18 is connected to the lower end of the chain 17. Motion of the chain 17 and the connected rod 18 is transmitted to the chain section 19 leading to the brake mechanism proper of the car through my improved quick take-up mechanism.

My improved quick take-up mechanism comprises broadly a supporting bracket A secured to the car; a swinging arm B pivotally supported on the bracket A; a power multiplying lever arm C pivotally connected to the lower end of the swinging arm B; a latch member D; and a spring E for said latch member.

The bracket A comprises a vertically disposed platelike section 20 having a horizontal, laterally, inwardly projecting flange 21 near its lower end which is suitably reenforced by side webs 22—22 formed integral therewith and with the lower end of said platelike section. As shown most clearly in Figures 3, 5, and 6, the lower end of the platelike section 20 is beveled off on one side to provide a tooth 23 for a purpose hereinafter pointed out. At the upper end, the platelike section 20 of the bracket A is provided with a pair of laterally, outstanding pivot lugs 24—24 which are perforated, as indicated at 25—25, to accommodate a pivot pin. The bracket A is mounted on the lower end portion of the wall 11 of the car with the platelike section abutting said end wall 11 and the flange 21 engaged underneath the bottom of the car body. This bracket is fixed to the car by any suitable means, such as rivets 26—26, extending through suitable ears 27—27 provided along opposite side edges of the platelike section 20.

The swinging arm B, which is preferably in the form of a steel casting, comprises a pair of platelike, spaced, side walls 28—28, of fan-shaped form, connected by a transverse outer wall 29, and a horizontal, transverse web 30. The web 30 is spaced inwardly from the upper ends of the side walls and is integral therewith and with the upper end of the wall 29 which terminates short of the upper ends of the side walls 28—28. The inner edges of the side walls 28—28 are straight for substantially their entire length, with the upper and lower corners thereof rounded off, as shown at 31—31. The outer edges of the side walls 28—28 are inclined outwardly and downwardly away from the end wall of the car and terminate in curved lower edge portions 32—32. The outer surface of the wall 29 is flush with the outer edges of the walls 28—28, and the wall 29 extends along said edges downwardly from the web 30 to, and a short distance along, the curved lower edge portions 32—32. An open space is thus provided at the lower end of the arm B between the side walls 28—28 thereof. Those portions of the side walls 28—28 which extend above the web 30 are provided with aligned pivot pin receiving openings 33—33 adapted to receive a pivot pin 34 which extends through the perforations 25—25 of the bracket A and pivotally supports the arm B on said bracket. At the lower end of the arm B, the side walls 28—28 thereof are provided with aligned pivot pin receiving openings 35—35 for a purpose hereinafter described. Above the level of the openings 35—35, adjacent the wall 29, the side walls 28—28 are provided with additional, transversely aligned, pivot pin receiving openings 36—36. On the underneath side of the web 30 is provided a downwardly projecting spring centering boss 37.

The lever arm C is in the form of a bell crank member which is enlarged at its upper end, as indicated at 38, said enlarged portion being accommodated between the side walls 28—28 of the arm B and connected thereto by a pivot pin 39 extending through said enlarged portion 38 and the openings 35—35 in the walls 28—28. The lower portion of the arm C, which is of lesser width than the portion 38, is curved downwardly and outwardly and is provided with a pin receiving opening 40 adjacent the end thereof. The arm C is operatively connected to the rod or link 18 by a pin 41 extending through the lower extremity of said rod and the opening 40 of said arm. As will be evident, the arm C is thus operatively connected to the winding means of the brake mechanism 13 by the rod 18 and the connecting chain section 17. Along the inner side edge the arm C is provided with a curved chain guide groove 42 which extends from the upper end of said arm along the inner side edge thereof, as shown in Figure 3, and terminates in a depression forming a pocket 44 in which the end link of the chain section 19 is anchored by a pin 45 extending through the opening of said link and the side walls of the pocket. The pocket 44 is about midway between the extremities of the arm C. The edge of the upper or enlarged portion 38 of the arm C provides a cam surface 145 comprising a substantially straight portion 46 and a rounded portion 47 which cooperate with the member D, as hereinafter pointed out.

The latch member D is in the form of a curved rack having a plurality of ratchet or locking teeth 48 on the upper edge thereof adapted to cooperate with the tooth 23 of the bracket A, as hereinafter described.

The member D extends into the space between the side walls 28—28 of the swinging arm B and is pivotally supported between said walls by a pin 49 extending through the inner extremity of said latch member D and the pivot pin receiving openings 36—36 of said walls 28—28. Inwardly of the pivoted end the latch member D is provided with an upstanding spring centering boss 50 opposed to the boss 37 of the web 30.

The spring E, which is in the form of a coil, is disposed between the side walls 28—28 of the swinging arm B and interposed between the web 30 of said arm and the latch member D, being held centered by the bosses 37 and 50 of said web and latch member, respectively. The spring E normally holds the latch member D in inactive or unlocked position with respect to the tooth 23, against the cam surface of the lever C, as clearly shown in Figure 3.

The spring E is of a capacity to normally resist swinging movement of the bell crank member C with respect to the arm B, thus causing the arm B and the bell crank member C to swing as a unit on the pivot pin 34 when the brake chain 17, together with the connecting rod 18, are pulled upwardly, as the application of the brakes is initiated, but of insufficient resisting strength to further oppose relative swinging movement of the bell crank C with respect to said arm B when the slack in the brake chain 19 and connected elements has been taken up and the tension on the chain section 19 increased by the brake shoes coming in contact with the wheels of the car. As will be evident, due to the contour of the cam surface 145 of the bell crank C, this cam surface will, upon relative swinging movement of the bell crank and the arm B, lift the latch D, swinging the same upwardly against the resistance of the spring and into locking engagement with the tooth 23 of the bracket A, as shown in Figure 5.

As will be evident, the arm B and the bell crank member C, when swung as a unit on the pivot of the bracket A, together function as a single bell crank means having a relatively long, effective, transmitting arm, substantially corresponding in length to the distance between the pivot 34 and the point of connection between the chain section 19 and the bell crank member C, and a short power application arm corresponding in length to the distance between the pivot 34 and the pull-up rod or link 18 for increasing the amount of motion transmitted from the brake 13 to the brake chain section 19 to quickly take up slack (Figure 3), while the bell crank C when swung relatively to the arm B functions as a part of the same bell crank means, and has a relatively long, effective lever arm corresponding approximately in length to the distance between the pivot 39 of the bell crank member C and the pivotal connection between the link 18 with said bell crank, and a relatively short arm corresponding in length approximately to the distance between the pivot 39 and the point of connection between the chain section 19 and the bell crank C, for multiplying the power transmitted from the brake mechanism 13 to the chain 19 which leads to the brake shoes of the car.

In the operation of applying the brakes, the chain 17 is forcibly pulled upwardly by the power multiplying means of the brake mechanism 13. During the initial upward pulling action, the arm B and the bell crank C are swung or rocked outwardly away from the car as a unit about the pivot 34, through application of the force to the lower end of the bell crank member at the connection of the latter with the pull-up rod or link 18. Any tendency of the bell crank C to move with respect to the arm B, at this stage of the operation is effectively resisted by the spring E, as hereinbefore pointed out. The described action continues until the parts approach the position shown in Figure 5, thus quickly taking up the slack in the brake chain section 19 and connected mechanism. As the parts reach the position shown in Figure 5, the slack has been completely taken up and the brake shoes are in contact with the wheels of the car. Due to the greater resistance encountered when the shoes engage the wheels of the car, the resistance of the spring E is offset and the bell crank member C is compelled to swing on the arm B. During the initial swinging movement of the bell crank C with respect to the arm B, the former is swung to the position shown in Figure 5, thereby camming the latch member D forcibly upwardly into engagement with the tooth 23 of the bracket A to lock the arm B against retrograde movement. As the application of the brakes is continued, the bell crank member C swings from the position shown in Figure 5 to that shown in Figure 6, thereby greatly multiplying the power and pressing the brake shoes against the car wheels with great force.

When the brakes are released by the chain 17 being unwound from the winding mechanism of the hand brake 13, the bell crank member C first swings backwardly on the arm B until the latch member D is disengaged from the tooth 23 of the bracket A by action of the spring E, the cam pressure on the latch member having been released by the return movement of the cam portion of the member C. The arm B is thus unlocked and becomes free to swing to its normal position. Due to the pressure exerted on the latch member D by the spring E and the locking tendency of the straight portion 46 of the cam surface 145, the arm B and the bell crank C are again locked together for movement as a unit back to the position shown in Figure 3.

I have herein shown and described what I now consider the preferred manner of carrying out my invention, but the same is merely illustrative and I contemplate all changes and modifications that come within the scope of the claims appended hereto.

I claim:

1. In a quick take-up mechanism for hand brakes for cars, the combination with a lengthwise movable pull-up rod; of a motion transmitting element extending lengthwise of the car; a pendant swinging arm pivoted at its upper end on the car; a depending bell crank pivoted at its upper end to the lower end of said arm; and spring means of predetermined capacity opposing relative swinging movement of said arm and bell crank while slack is being taken up in the brake mechanism to compel said arm and bell crank to swing as a unit, said spring yielding to permit swinging movement of the bell crank on said arm when a predetermined resistance is encountered to application of the brakes, said pull-up rod being pivotally connected at its lower end to the lower end of the bell crank and said motion transmitting element being anchored to said bell crank at a point between the ends of the latter, offset laterally inwardly with respect to the pivotal connection between the pull-up element and bell crank.

2. In a quick take-up mechanism for hand brakes for cars, the combination with a lengthwise movable pull-up element; of a horizontally movable motion transmitting element; swinging connecting means between said elements for transmitting motion from the first named to the second named element, said means comprising a pendant arm hinged between its ends, the upper end of said arm being pivotally hung on the car and the lower extremity of said arm being extended laterally outwardly beyond the remaining portion of said arm below the hinge thereof, said pull-up element being anchored at its lower end to said outwardly extended lower extremity of said arm, said motion transmitting element being anchored to said arm between the hinge of said arm and said outwardly extended lower extremity of said arm; and means for resisting relative hinging movement of the hinged portions of said arm, to compel said arm to swing as a unit on the pivotal connection thereof with the car during initial application of the brakes while the slack in the brake mechanism is being taken up, said means for resisting relative hinging movement being automatically rendered ineffective when the resistance to movement of the transmitting element is increased by the slack having been taken up, thereby permitting hinging movement of the hinged portions of said arm with respect to each other.

3. In a quick take-up mechanism for hand brakes for cars, the combination with a lengthwise movable pull-up element extending along the vertical wall of the car; of a horizontally extending motion transmitting element; and bell crank means for transmitting motion from said pull-up element to said transmitting element, comprising a swinging support on the car; a bell crank member pivotally mounted on said swinging support; a cam portion on said bell crank, said bell crank member being connected respectively to said pull-up element and motion transmitting element; and spring means interposed between the cam portion of said bell crank member and support yieldingly opposing relative swinging movement of said bell crank member and swinging support to compel said bell crank member and support to swing as a unit during initial application of the brakes, and permit said bell crank member to swing on said support when the tension in the brake mechanism is increased by complete take-up of slack.

4. In a quick take-up mechanism for hand brakes for cars, the combination with a pulling element; of a motion transmitting element; a swinging arm pivotally supported on the car; a bell crank member pioted on said arm at a point removed from the pivotal support of said arm on the car, said member having long and short lever arms to which said pulling element and motion transmitting element are respectively anchored, said member having a cam portion; and spring means cooperating with said cam portion of said member and bearing on said arm, said spring offering predetermined resistance to relative movement of said bell crank member and arm to compel said arm and member to swing as a unit with respect to the car when light resistance is offered to application of the brakes and permit swinging movement of said member on said arm when increased resistance is encountered.

5. In a quick take-up mechanism for hand brakes for cars, the combination with a pull-up element; of a motion transmitting element; a swinging arm pivoted at its upper end on the car; a bell crank pivoted at its upper end to the lower end of said arm, said bell crank having a cam portion at said upper end; and spring means of predetermined capacity coacting with said cam portion to oppose swinging movement of the bell crank on said arm when a predetermined resistance is encountered to application of the brakes, said pull-up element and motion transmitting element being anchored to said bell crank.

6. In a quick take-up mechanism for hand brakes for cars, the combination with a pull-up element; of a motion transmitting element; swinging connecting means between said elements for transmitting motion from said first named to said second named element, said means comprising an arm hinged between its ends, one end of said arm being pivotally hung on the car and the other end of said arm having the pull-up element and motion transmitting elements anchored thereto, the anchorage of one of said elements being more remote from the hinge of said arm than the anchorage of the other element; a cam portion on one of the hinged portions of said arm; a pivoted latch on the other hinged portion of said arm, actuated by said cam portion upon relative hinging movement of the portions of said arm to lock said arm against retrograde movement; and spring means resisting locking movement of said latch means and relative hinging movement of the portions of said arm to compel said arm to swing as a unit on the pivotal connection thereof with the car during initial application of the brakes while the slack in the brake mechanism is being taken up, the resistance of said spring means being overcome when the resistance to movement of the transmitting element is increased by the slack having been taken up, thereby permitting hinging movement of the hinged portions of said arm with respect to each other and actuation to locking position of said latch means by said cam portion.

7. In a quick take-up mechanism for hand brakes for cars, the combination with a pulling element; of a motion transmitting element; a fixed support on the car; an arm pivotally hung on said support; a bell crank pivoted to said arm at a point removed from the pivotal connection of said arm with said support; a cam portion on the pivoted end of said bell crank; a pivoted latch member engageable with said support to lock the arm against swinging movement toward the car; and a spring yieldingly holding said latch member disengaged from said support and in engagement with the cam portion of said bell crank, said spring being of a capacity to resist relative swinging movement of the bell crank and arm to compel said bell crank and arm to swing as a unit during initial application of the brakes and permit said bell crank to swing on said arm when the tension in the brake mechanism is increased by complete taking up of slack.

8. In a quick take-up mechanism for hand brakes for cars, the combination with a support on the car having a locking tooth; of a pendant arm pivotally mounted at its upper end on said support; a bell crank having a head pivotally supported on the lower end of said arm; a cam portion on said head; a latch pivoted on said arm above the bell crank, said latch being engageable with said locking tooth to hold the arm against swinging movement toward the car; a pull-up member connected to the bell crank at a point removed from the pivot of the latter; a chain section leading to the brake mechanism proper of the car, said chain section being anchored to the bell crank, said anchorage being a lesser distance from the pivot of the bell crank than the connection of the pull-up member therewith; and spring means bearing on said latch and yieldingly holding the same engaged with the cam head of the bell crank and disengaged from said tooth, said spring means being only of sufficient capacity to resist relative swinging movement of the bell crank and arm during the time that the slack in the brake mechanism is being taken up, but of insufficient capacity to resist said relative swinging movement when the tension in the brake mechanism is increased beyond that existing during taking up of slack.

ROLAND J. OLANDER.